(12) United States Patent
Lebrun (10) Patent No.: US 8,604,741 B2
(45) Date of Patent: Dec. 10, 2013

(54) SECURE MONITORING AND CONTROL DEVICE FOR AIRCRAFT PILOTING ACTUATOR

(75) Inventor: Jean-Louis Lebrun, Chatellerault (FR)

(73) Assignee: Thales, Neuilly Sur-Seine (FR)

( * ) Notice: Subject to any disclaimer, the term of this patent is extended or adjusted under 35 U.S.C. 154(b) by 569 days.

(21) Appl. No.: 12/874,657

(22) Filed: Sep. 2, 2010

(65) Prior Publication Data

US 2011/0210210 A1    Sep. 1, 2011

(30) Foreign Application Priority Data

Sep. 8, 2009 (FR) ...................................... 09 04272

(51) Int. Cl.
    *G05B 23/02*        (2006.01)
(52) U.S. Cl.
    USPC .................... 318/565; 318/400.38; 244/99.14; 244/221; 244/228; 244/229
(58) Field of Classification Search
    USPC .......... 318/565, 400.38; 244/99.14, 221, 228, 244/229
    See application file for complete search history.

(56) References Cited

U.S. PATENT DOCUMENTS

| 4,095,763 | A  |     | 6/1978  | Builta |
| 5,367,237 | A  |     | 11/1994 | Ring et al. |
| 6,700,345 | B2 | *   | 3/2004  | Wilkens ........................ 318/626 |
| 6,791,219 | B1 |     | 9/2004  | Eric et al. |
| 6,827,311 | B2 | *   | 12/2004 | Wingett et al. .............. 244/99.5 |
| 7,007,897 | B2 | *   | 3/2006  | Wingett et al. ............... 244/227 |
| 7,549,605 | B2 | *   | 6/2009  | Hanlon et al. ............... 244/75.1 |

FOREIGN PATENT DOCUMENTS

EP    1 036 734 A2    9/2000
FR    2 694 822 A1    2/1994

\* cited by examiner

*Primary Examiner* — Erick Glass
(74) *Attorney, Agent, or Firm* — Baker & Hostetler LLP (57) ABSTRACT

A monitoring and control device for an aircraft actuator includes a control module, delivering control signals for the actuator and position signals for the actuator determined according to control messages received from a piloting management system of the aircraft, and at least one first position sensor supplying information concerning the position of the actuator, and a monitoring module, delivering position signals for the actuator and receiving the control signals received from the piloting management system of the aircraft, and information relating to the position of the actuator supplied by at least one second position sensor. The control and monitoring modules are capable of assessing the consistency of the signals processed therein and of controlling accordingly a power supply and disabling module of the actuator.

21 Claims, 4 Drawing Sheets

SECURE MONITORING AND CONTROL DEVICE FOR AIRCRAFT PILOTING ACTUATOR

CROSS-REFERENCE TO RELATED APPLICATIONS

This application claims priority to foreign France patent application No. 0904272, filed on Sep. 8, 2009, the disclosure of which is hereby incorporated by reference in its entirety.

FIELD OF THE INVENTION

The present invention relates to a secure monitoring and control device for a piloting actuator of an aircraft. It applies notably to the field of aeronautics, and more particularly to the piloting actuators of aeroplanes or helicopters.

BACKGROUND

An aircraft is piloted by the actuation of piloting means, manually by a pilot, or automatically or semi-automatically via an automatic piloting device. Thus, an automatic piloting device may facilitate the control of the aircraft by the pilot, and provide better flight stability and safety, and may also servocontrol one or more flight parameters, such as the altitude, vertical speed, longitudinal speed, heading, etc., upon one or more setpoint values input by the pilot.

The actuation of the piloting means acts on members of the aircraft that are used to modify its flight dynamics, directly via a transmission chain or "rod linkage", or by the action of a rod linkage on power members such as hydraulic valves, the latter case being the commonest, notably in large aircraft and the most sophisticated aircraft. For example, in a helicopter, a lateral or longitudinal movement of the control stick respectively acts on the lateral or longitudinal axis of the latter, that is to say on the pitch and roll control, by modifying the incidence of the blades of the main rotor. An action on the rudder bar controls the yaw of the helicopter, by modifying the incidence of the blades of the tail rotor. The incidence control of the blades of the various rotors is modified by mechanical actuators, for example electromechanical or hydromechanical actuators. Similarly, the incidence of elevators or rudders of an aeroplane, and the incidence of ailerons and flaps, can be modified by mechanical actuators. The latter may be linear actuators or rotary actuators.

There are also various types of mechanical actuators, notably actuators called "trim actuators" and actuators called "series actuators". The "series actuators", also designated "series screw jacks", are placed in series with the flight controls, and comprise a body and an output spindle. The series actuators typically have a short response time and reduced authority. The latter are usually of the worm screw/nut type and are controlled by an electric motor. For example, for a linear series actuator, an electrical control causes a rotation of the spindle of the electric motor, and the rotation movement is converted into translation movement of the output spindle of the actuator relative to its body. The series actuators are said to be mechanically irreversible, which means that they are deformed only when an electrical control is applied to them. In particular, when the automatic piloting equipment is not operating, the series actuators have no effect on the control of the aircraft.

For safety reasons, it is standard practice to use redundancy of the actuators coupled to the automatic piloting equipment. Most of the aircraft equipment known from the state of the art has recourse to "slave" type actuators, that is to say actuators that have zero or limited intelligence. The latter in effect simply return position or speed information in a crude form, via sensors of potentiometer or resolver type, passive linear displacement sensors, commonly designated by the acronym LVDT, standing for "Linear Variable Differential Transformer", or even passive rotation displacement sensors, commonly designated by the acronym RVDT, standing for "Rotary Variable Differential Transformer". These actuators are normally powered or excited by external devices. Diagnosing their correct operation is generally reduced to sending a Boolean correct operation summary variable to a general monitoring module associated with the automatic pilot device.

In the interests of ongoing improvement to the safety of aircraft, whose piloting characteristics continually increase, a decentralization of the general monitoring intelligence has been observed, to the benefit of the actuator members themselves. Notably, self-monitoring and self-diagnosing of an actuator relative to the piloting controls that it receives should in particular enable it to react earlier (for example by self-disabling) and avoid placing the aircraft in a catastrophic piloting situation. Reaction time savings of a few tens to a few hundreds of milliseconds can thus be sought, in comparison to conventional centralized monitoring on a piloting chain.

Consequently, if a certain intelligence is transferred into the actuator, at the same time certain operating safety constraints concentrated in the automatic pilot system are transferred, notably the management of catastrophic failures. These safety constraints induced on the actuator that has become more independent lead to the implementation of particular architecture and monitoring principles, designed to satisfy the various safety constraints. Furthermore, it is desirable for these architectures, associated with a number of actuators in an aircraft, to be optimized in terms of integration and cost.

SUMMARY OF THE INVENTION

The present invention mitigates the abovementioned drawbacks, by proposing a monitoring and safety architecture for an aircraft actuator, that makes it possible to control and monitor the actuator, while satisfying the required safety constraints.

One advantage of the present invention is that the proposed architecture can be implemented in a small footprint.

Another advantage of the present invention is that the proposed architecture can be produced inexpensively.

Another advantage of the present invention is that it allows for a substantial reduction in the processor load of the automatic piloting device of the aircraft in which it is implemented.

To this end, the subject of the invention is a monitoring and control device for an aircraft actuator, characterized in that it comprises:
  a control module, delivering control signals for the actuator and position signals for the actuator respectively determined according to control messages received from a piloting management system of the aircraft, and at least one first position sensor supplying information concerning the position of the actuator,
  a monitoring module, delivering actuator position signals and simultaneously receiving the control messages received from the piloting management system of the aircraft, and information relating to the position of the actuator supplied by at least one second position sensor, said control and monitoring modules being capable of assessing the consistency of the signals processed therein and of controlling accordingly an actuator power supply and disabling module.

In one embodiment of the invention, the monitoring and control device may be characterized in that the actuator is moved by a brushless electric motor, the first position sensor being a Hall-effect type sensor supplying information concerning the rotational positioning of the rotor of the motor, the position of the actuator being determined by the control module based on an initial position datum supplied by the monitoring module.

In one embodiment of the invention, the monitoring and control device may be characterized in that the initial position datum is supplied to the control module when the monitoring and control device for an actuator is started up.

In one embodiment of the invention, the monitoring and control device may be characterized in that the second position sensor is an actuator position sensor.

In one embodiment of the invention, the monitoring and control device may be characterized in that the control module comprises:
- an actuation module controlling the actuator via the power supply and disabling module,
- a first position processing module processing the data originating from the first position sensor and generating and sending to the actuation module a first signal representative of the position of the actuator.

In one embodiment of the invention, the monitoring and control device may be characterized in that the control module comprises a first simulation module receiving the control messages received from the piloting management system of the aircraft, and simulating the behaviour of the actuator, generating a first actuator virtual position signal.

In one embodiment of the invention, the monitoring and control device may be characterized in that the monitoring module comprises a second position processing module processing the data originating from the second position sensor and generating a second signal representative of the position of the actuator.

In one embodiment of the invention, the monitoring and control device may be characterized in that the monitoring module comprises a second simulation module receiving the control messages received from the piloting management system of the aircraft, and simulating the behaviour of the actuator, generating a second actuator virtual position signal.

In one embodiment of the invention, the monitoring and control device may be characterized in that it comprises a first comparator, the output of which changes from one nominal logic level to the other if the first actuator virtual position signal differs from the first signal representative of the position of the actuator by a value greater than a first determined threshold.

In one embodiment of the invention, the monitoring and control device may be characterized in that it comprises a second comparator, the output of which changes from one nominal logic level to the other if a control signal received by the control module differs from the control signal received simultaneously by the monitoring module by a value greater than a second determined threshold.

In one embodiment of the invention, the monitoring and control device may be characterized in that it comprises a third comparator, the output of which changes from one nominal logic level to the other if the second actuator virtual position signal differs from the second signal representative of the position of the actuator by a value greater than a third determined threshold.

In one embodiment of the invention, the monitoring and control device may be characterized in that it comprises a fourth comparator, the output of which changes from one nominal logic level to the other if the first signal representative of the position of the actuator differs from the second signal representative of the position of the actuator by a value greater than a fourth determined threshold.

In one embodiment of the invention, said power supply and disabling module may comprise:
- a power supply module powered by a main power supply voltage, and processing the power supply signal to generate the power supply signals for the various modules forming the monitoring and control device;
- a power distribution module, generating, on the basis of the information supplied by the actuation module, a modulated signal to control the motor, and responsible for freezing or disabling the actuator in the event of failure, detected on the basis of a summary logic signal dependent at least on the logic level of the outputs of the comparators.

In one embodiment of the invention, said power supply and disabling module may comprise, on the main power supply line, a power breaker, a first current measuring device, in series with which is arranged a power bridge, the power bridge comprising a top switch in series with a bottom switch and generating the modulated control signal for the motor, the power breaker and said switches being controlled by said summary logic signal.

In one embodiment of the invention, the power breaker, the switches and the motor may be controlled via logic switchers:
- a first logic switcher controlling the power breaker, and being maintained by a dynamic signal of determined frequency,
- a second logic switcher controlling the switches, and being maintained by a dynamic signal of determined frequency,
- a third logic switcher controlling the activation of the modulated control signal for the motor.

In one embodiment of the invention, the motor may be a brushless-type motor with three windings, the top switch and the bottom switch each being formed by three field-effect transistors respectively associated with each winding of the motor.

In one embodiment of the invention, the monitoring and control device may be characterized in that the summary logic signal is also conditioned by logic results of correct operation tests on the modules forming the monitoring and control device.

In one embodiment of the invention, the monitoring and control device may be characterized in that the freezing or disabling of the actuator is also controlled by logic disabling signals from the flight management system.

In one embodiment of the invention, the monitoring and control device may be characterized in that the control module and the monitoring module are implemented in at least one programmable logic circuit.

In one embodiment of the invention, the monitoring and control device may be characterized in that the control module is implemented in a first programmable logic circuit, and the monitoring module is implemented in a second programmable logic circuit.

In one embodiment of the invention, the control module and the monitoring module may be associated with one and the same power supply circuit.

In one embodiment of the invention, the control module and the monitoring module may be each associated with a dedicated power supply circuit.

In one embodiment of the invention, the monitoring and control device may be characterized in that the control module, the monitoring module, the actuator, the position sensors and the power supply and disabling module are integrated in one physical module.

BRIEF DESCRIPTION OF THE FIGURES

Other features and advantages of the invention will become apparent from reading the description, given by way of example, made in light of the appended drawings which represent.

DETAILED DESCRIPTION

Figure 1:
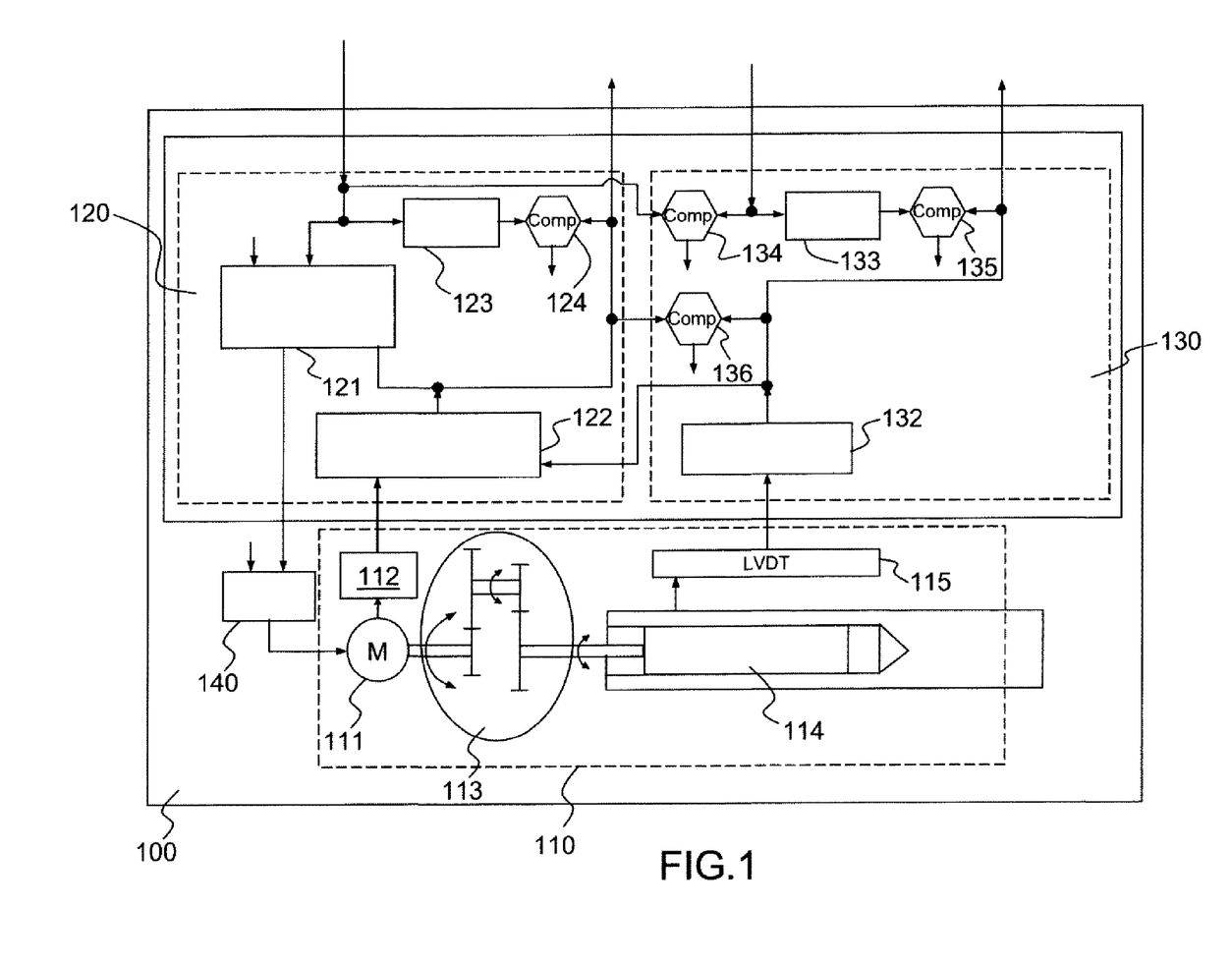
FIG. 1, a functional diagram illustrating a secure device architecture according to an exemplary embodiment of the present invention.

FIG. 1 shows a functional diagram illustrating a secure device architecture according to an exemplary embodiment of the invention.

With reference to FIG. 1, a secure device 100 comprises a series actuator 110, a control module 120, a monitoring module 130 and a power supply and disabling module 140.

In the example illustrated by the figure, the series actuator 110 comprises a motor 111 associated with a first position sensor 112. The shaft of the motor 111 may be linked to a gearbox 113, the output shaft of which can drive translation-wise a worm screw device 114, the moving part or "piston" of which may be directly linked to an aircraft control member, not represented in the figure. The worm screw 114 may be associated with a second position sensor 115.

The power supply and disabling module 140 manages the low voltage power supplies for the various electronic modules, but also the power supply for the motor 111, for the position sensors 112, 115, and the current measurements such as the measurement of the power supply current for the motor 111. The power supply and disabling module 140 also manages the freezing or the disabling of the secure device 100, in the event of detected failures.

In the example illustrated by the figure, the control module 120 comprises an actuation module 121, a first position processing module 122, a first simulation module 123, and a first comparator 124. The monitoring module 130 comprises a second position processing module 132, a second simulation module 133, a second comparator 134, a third comparator 135 and a fourth comparator 136.

The control module 120 is used to deliver the electrical controls for the motor 111 for the displacement of the series actuator 110, according to signals received by a piloting chain situated upstream, and comprising, for example, an automatic pilot system. In one embodiment of the invention, the control module 120 may receive signals in return, representative of the position of the motor 111; the motor 111 may, in practice, be a motor of brushless motor type. Such motors are usually equipped with Hall-effect sensors, that are used to supply information on the rotational positioning of the rotor of the latter. Typically, brushless motors are equipped with three windings, and consequently with three Hall-effect sensors. The first position processing module 122 converts the signals originating from the Hall-effect sensors 112 into a signal representative of the position of the series actuator 110. This signal is notably sent to the actuation module 121, and to a flight management system; in the example where the aircraft concerned is a helicopter, such a flight management system is usually designated by the acronym FCM, standing for "Flight Control Management". It should be noted that the control messages received directly from the pilot and/or from the automatic piloting system are sent to the actuation module 121.

In parallel, the monitoring module 130 receives data originating from the second position sensor 115. These data are processed by the second position processing module 132; a signal representative of the position of the actuator 110 is then notably sent to the FCM. In one exemplary embodiment of the invention, the second position sensor 115 may be an LVDT-type sensor.

It is also possible for example to use a redundancy comprising two LVDT-type position sensors, in order to ensure operation, even in the event of failure of one of the two sensors. It should be noted that one advantage obtained by the structure described above lies in the fact that just one LVDT-type position sensor is necessary, the redundancy being provided by the use of the first position sensor, of Hall-effect sensor type, bearing in mind that such sensors are commonly incorporated in brushless-type motors. In a secure system, the use of a redundancy of sensors of different types is particularly advantageous.

It should, however, be noted that the position information supplied by the Hall-effect sensors is relative information. To mitigate this problem, the invention advantageously proposes initializing the position data of the actuator 110 as interpreted by the first position processing module 122 on the basis of the information supplied by the Hall-effect sensors. To this end, it is possible to initialize these data, with position data for the actuator 110 calculated by the second position processing module 132. In order for this initialization not to compromise the safety of the device, it is possible to envisage having the latter produced just once, for example when the system is started up. The initialization may be produced by the communication of an initialization message between the second position processing module 132 and the first position processing module 122. Thereafter, even in the event of a diagnosed failure of any module, no information of this type is communicated between the position processing modules 132 and 122.

According to one embodiment of the invention, the comparators 124, 134, 135, 136 make it possible to provide temporary disabling or even permanent disabling of the actuator 110, in the event of failure; in some detected failure cases, a slowing-down of the actuator may be commanded. A comparator 124, 134, 135, 136 is used to check the consistency of the two signals that are applied to it as input, that is to say, to check that the two signals lie within a determined range of values. One comparator 124, 134, 135, 136 supplies, for example as output, a Boolean signal. The output from a comparator changes, for example, from one logic level to the other, if the difference between the signals applied as input is greater than a determined threshold value. The particular configuration of the comparators offers a redundancy that makes it possible to ensure the disabling regardless of the failure mode.

The first comparator 124 belongs to the control module 120. The first comparator 124 checks the consistency of the position information of the actuator 110 supplied by the first position processing module 122, with position information for a virtual actuator supplied by the first simulation module 123. The first simulation module 123 is a model of the actuator 110, for example simplified to the first or second degree, and taking into account both the dynamic characteristics of the actuator 110, but also the measured level of the power supply of the actuator 110, which is a determining factor on the dynamic behaviour of the latter, and therefore on its ability to follow a set point. The first comparator 124 produces, for example, as output, a Boolean type indication, which changes from one logic level to the other in the event of failure of the actuator 110 itself, or else of the first position sensor 112, or else of the first simulation module 123, or even of the first comparator 124 itself.

The second comparator 134 belongs to the monitoring module 130. The second comparator 134 checks the consistency between the control signal received by the control module 120 from the flight management system, and the control signal received in parallel by the monitoring module 130. The control signals may, for example, conform to international standards, and be conveyed via a dedicated bus, for example of ARINC 429 type. Thus, a failure mode originating from the piloting chain situated upstream of the secure device 110 changes the logic output of the second comparator 134 from one logic level to the other, and causes, for example, a freezing of the actuator 110, that is to say, a temporary disabling of the latter, until, for example, the compared signals are once again diagnosed as consistent, or else until the actuator 110 is recentred or recalibrated by a specific command sent directly by the pilot, or else automatically by the flight management system of the aircraft.

The third comparator 135 belongs to the monitoring module 130. The third comparator 135 checks the consistency of the position information for the actuator 110 supplied by the second position processing module 132, with position information for a virtual actuator supplied by the second simulation module 133. The second simulation module 133 is, in a manner similar to the first simulation module 123, a model of the actuator 110. The third comparator 135 produces, for example, as output, a Boolean type indication, which changes from one logic level to the other in the event of failure of the actuator 110 itself, or else of the second position sensor 115, or else of the second simulation module 133, or even of the third comparator 135 itself. Such a failure then produces a disabling of the actuator 110.

The fourth comparator 136 belongs to the monitoring module 130. The fourth comparator 136 checks the consistency of the position signal of the actuator 110 from the second position processing module 132 and of that from the first position processing module 122. Thus, a failure of the first position sensor 112, of the second position sensor 115, of the first position processing module 122, of the second position processing module 132, or even of the fourth comparator 136 itself, results in the changing of the logic output of the fourth comparator 136 from one logic level to the other, and then produces a disabling of the actuator 110.

The output of the first comparator 124 may be combined with logic levels determined by other monitoring tests performed within the control module 120. For example, a test may be performed on the correct behaviour of the operating current of the motor 111 relative to data loaded when the device was powered up. Another test of the imminent arrival of the actuator 110 at the end stop may also be performed.

Similarly, the outputs of the second, third and fourth comparators 134, 135, 136 may be combined with logic levels determined by other monitoring tests performed within the monitoring module 130. For example, a test may be performed on the correct behaviour of certain parameters internal to the actuator 110, such as voltages sampled on various phases of the motor 111. A test may also be performed on the correct behaviour of the mains current of the main power supply relative to limits that are predefined, and that may vary dynamically with the main power supply voltage. A test may also be carried out on the correct behaviour temperature-wise of the actuator 110, based on information supplied by a temperature sensor. A test may also be carried out on the detection of the end stop position of the actuator 110, by the identification of a motor overcurrent beyond a position that is assessed as being very close to the physical end stops of the actuator 110. It should be noted that, in addition to end stop position detection tests that are essentially electrical in nature, it is possible to limit the travel of the worm screw 114 with physical end stops, not represented in the figure.

The logic data may thus all be combined together, and constitute a portion of the input data on safety blocks controlling the disabling, the slowing-down or the freezing of the actuator 110. The structure of these safety blocks is explained in detail hereinbelow, with reference to FIGS. 3 and 4.

The disabling, the slowing-down or the freezing of the actuator 110 may be produced at various levels, notably, the freezing of the actuator 110 may be produced by the opening of a control switch for the actuation module 121, the control function of the motor 111 then being suspended. The actuation module 121 may also, for example, be able to receive a centring message for the actuator, originating from the pilot or else from the flight management system of the aircraft. The disabling of the actuator 110 may be produced upstream, in the power supply and disabling module 140. The power supply and disabling module 140 is described in detail hereinbelow, with reference to FIG. 2. It is used notably to control the power to the actuator 110, for example via a control signal of pulse width modulation type, commonly designated by the acronym PWM, obtained from the actuation module 121; furthermore, the power supply and disabling module 140 is able to activate safety devices according to the output of the four comparators 124, 134, 135, 136 and logic data obtained from the various abovementioned safety tests, so as to disable or stop the actuator 110.

Figure 2:
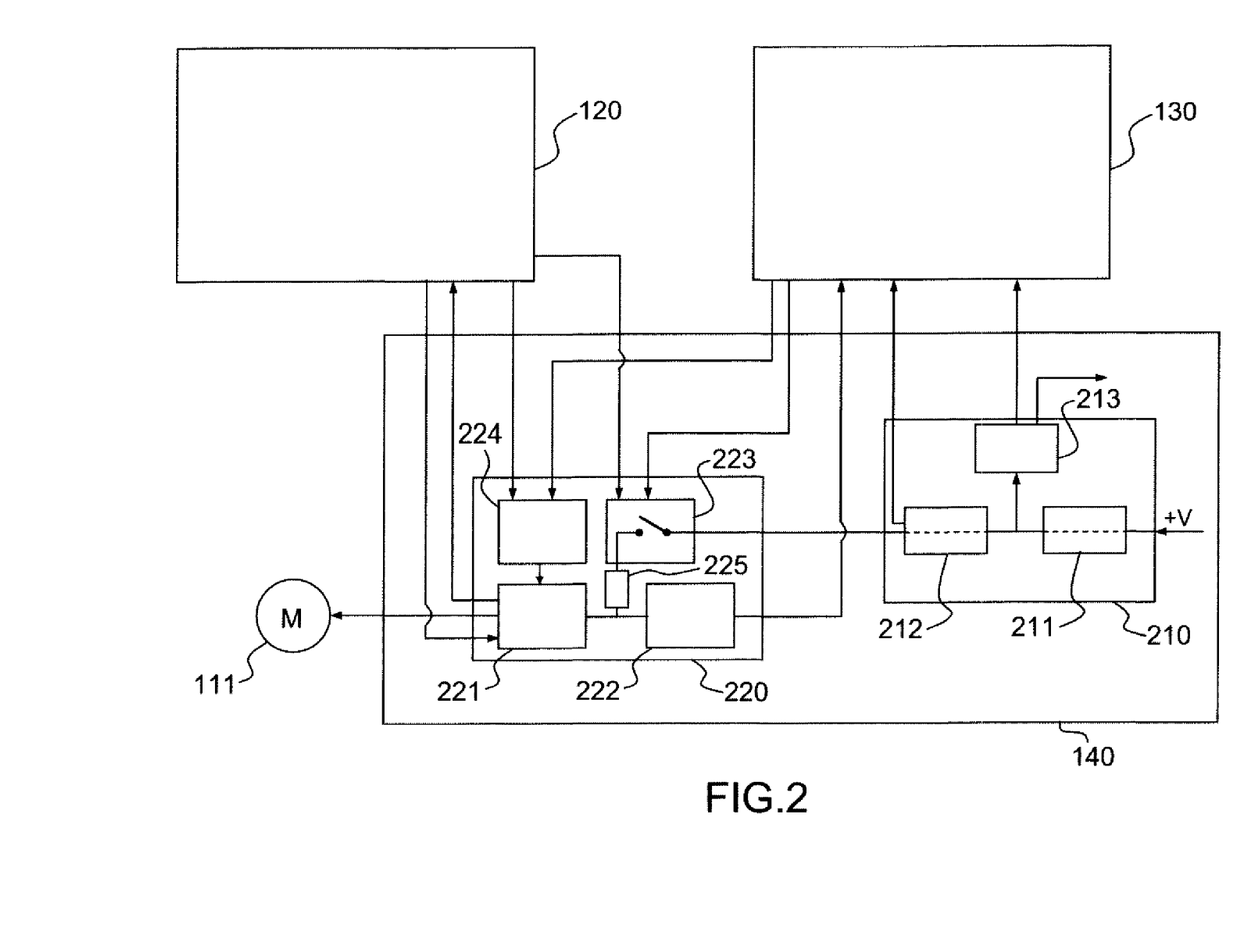
FIG. 2, a functional diagram representing the power supply and disabling module of a secure device according to an exemplary embodiment of the present invention, FIG. 3, a functional diagram schematically illustrating the detail of a power distribution module according to an exemplary embodiment of the present invention.

FIG. 2 is a functional diagram representing the power supply and disabling module of a secure device according to an exemplary embodiment of the present invention.

In this exemplary embodiment of the invention, the power supply and disabling module 140 may comprise a power supply module 210, linked to a power distribution module 220.

The power supply module 210 is powered by a DC power supply voltage +V. A typical value of the voltage V is between 20 volts and 30 volts. In the example illustrated by FIG. 2, the power supply module 210 comprises a lightning protection and filtering module 211, a protection module 212 which may notably comprise a reverse polarity protection device, for example a diode and/or an inrush current limiting circuit, and a DC voltage conversion module, or "DC-DC" conversion module 213. The power supply voltage V is applied as input to the lightning protection and filtering module 211. The duly filtered signal may be sent to the DC-DC conversion module 213, the function of which is to produce the voltages of various values required, for example, to power the various electronic modules that form the secure device, the various position sensors, additional sensors linked to the monitoring module 130, such as temperature sensors, etc. The DC-DC conversion module 213 may also comprise a step-up converter and/or charging pumps, capable of producing higher voltages than the power supply voltage (for example, to control the motor power supply), or else voltages of intermediate values. The DC-DC conversion module 213 may also comprise an energy storage device, capable of powering the various electronic modules in the event of failure of the main power supply, for example. The power supply voltage +V is directed to the power distribution module 220.

The distribution module 220 may comprise a power bridge 221, a voltage measuring module 222, a power breaker 223, a first current measuring module 225 and a slowing-down module 224. The power bridge 221 is described in detail hereinbelow with reference to FIG. 3. The value of the current measured by the first current measuring module 225 may, for example, be useful to the protection module 212 for triggering, if necessary, the inrush current limiting circuit.

The power breaker 223 may also receive this information from the first current measuring module 225, and act directly as inrush current limiter when the monitoring and control device 100 is implemented.

Figure 3:
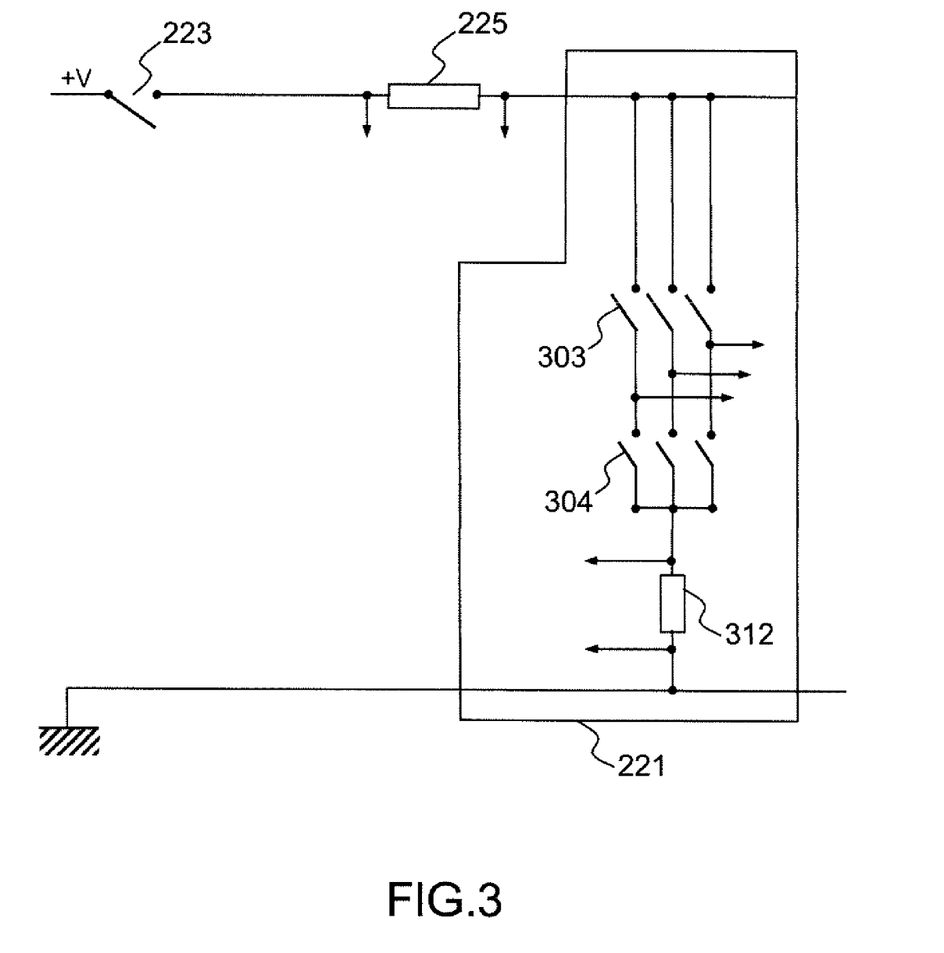

FIG. 3 is a functional diagram schematically illustrating the detail of a power bridge according to an exemplary embodiment of the present invention.

In this exemplary embodiment of the invention, the power breaker 223 may be linked to a line raised to the power supply voltage +V, and connected in series with the first current measuring module 225, which may be a resistor. Downstream of the first current measuring module 225 is the power bridge 221 with six switches, for example of chopping transistor type. The power bridge 221 comprises three top switches 303 and three bottom switches 304. A second current measuring module 312 may be arranged downstream of the switches 303, 304. The second current measuring module 312 may, for example, be a resistor.

The top switches 303 of the power bridge 221 may be simultaneously switched off in a failure situation and thereby give redundancy to the same expected power breaking function of the power breaker 223, placed upstream on the power supply line. The series connection of these two levels of power switches formed by the power breaker 223 and the three top switches 303 makes it possible to satisfy a high safety level. The switches 303, 304 may, for example, be transistors of field-effect transistor type, commonly designated by the acronym MOSFET.

In one exemplary embodiment of the invention, the switches 303, 304 may be switched on only in the presence of a fail-safe multivibrator signal of an intermediate frequency, for example of 1 MHz, maintained by one of the safety blocks mentioned above, with reference to FIG. 1, and described in detail hereinbelow with reference to FIG. 4. When this maintenance signal disappears, the supply of energy to the actuator 110 is cut off via the three top switches 303, and the three bottom switches 304 of the power bridge 221 forming the block 304 are switched on, ensuring an effective slowing-down of the motor 110, the latter then seeing its three windings short-circuited. The rapid slowing-down that is thus available contributes to the overall safety of the actuator 110.

The first current measuring module 225 mentioned above, with reference to FIG. 2, by giving an indication of the overall average current of the actuator on the +V line, complements the current monitoring performed through the second current measuring module 312 arranged in the foot of the power bridge 221. After suitable processing, the second current measuring module 312 provides an image of the phase currents of the motor 111 and therefore of its torque, and is used for the correct control of the operation of the motor 111. The current information that is thus available is also monitored to detect any failures or malfunctions of the actuator 110, as was described previously with reference to FIG. 1.

Figure 4:
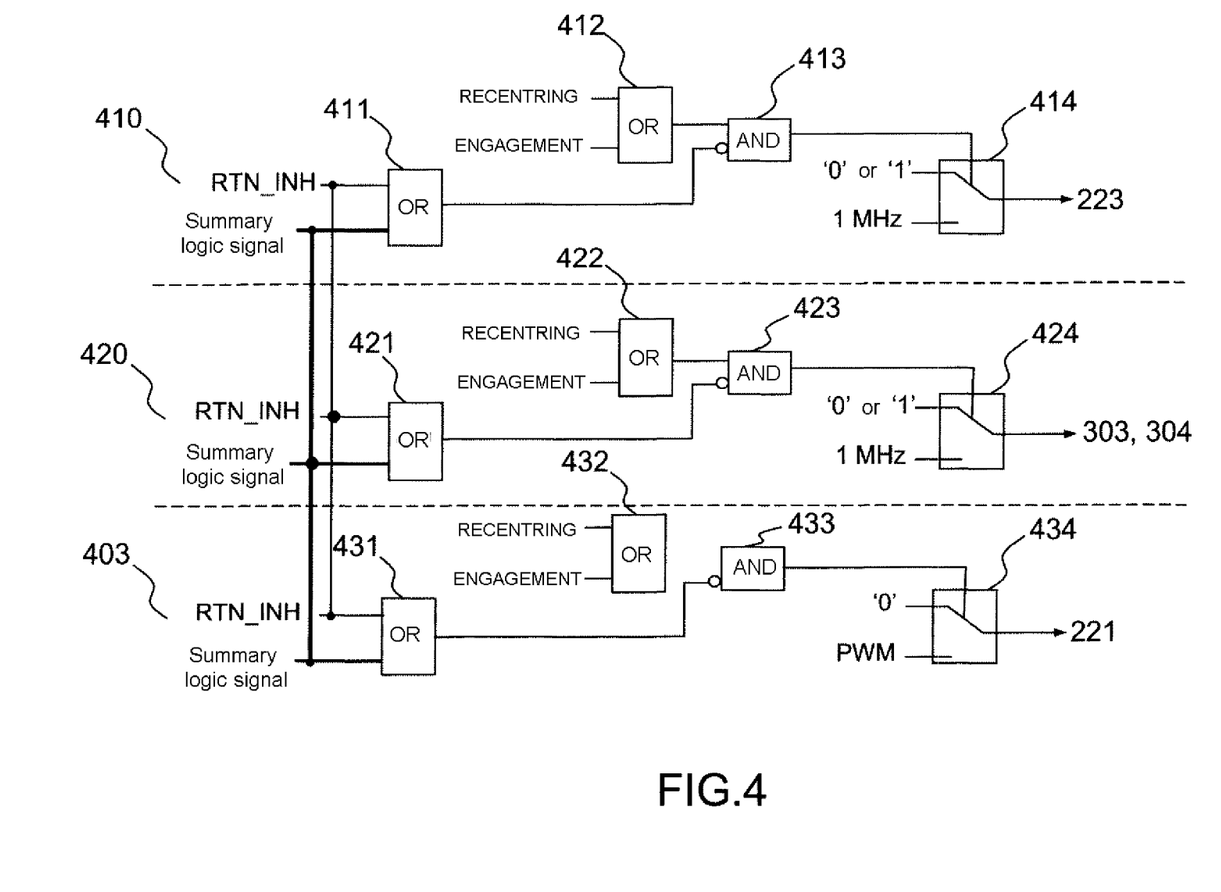
FIG. 4, a functional diagram illustrating an actuator disabling principle implemented in an exemplary embodiment of the present invention.

FIG. 4 shows a functional diagram illustrating an actuator disabling principle implemented in an exemplary embodiment of the present invention.

A first safety block 410 is linked to the power breaker 223 mentioned above with reference to FIG. 3. A second safety block 420 is linked to the top and bottom switches 303 and 304 mentioned above with reference to FIG. 3. A third safety block 430 is linked to the actuation block 121 mentioned above with reference to FIG. 1.

In an exemplary embodiment, the first safety block 410 comprises a first "OR" type logic operator 411 driven:
  by all the monitoring signals from the control 120 and monitoring 130 modules, determined by the outputs of the four comparators 124, 134, 135, 136 and bits deriving from the various additional tests performed in the control module 120 and the monitoring module 130, and cited previously with reference to FIG. 1, and
  by a disabling logic signal RTN_INH, a logical duplication of one or other of the external disabling commands activated in parallel either by the FCMs or by the pilot and acting directly at the lowest level on the power breaker 223 or from the enabling circuit for the power bridge 221 supplying energy to the actuator 110.

The output of the first logic operator 411 is inverted and drives the input of a third "AND" type logic operator 413, the other input of the third logic operator 413 being driven by the logic output of a second "OR" type logic operator 412, which is itself driven by logic signals deriving from commands respectively for recentring the actuator 110 and for engaging the latter. Engagement corresponds to a software enabling of the activation of movement of the actuator, for example via a specific bit in an Arinc-type command word 429. Via a first logic switcher 414, the output of the fourth logic operator 413 conditions the opening of the power breaker 223. The first logic switcher 414 corresponding to the "1" state of the fourth logic operator 413 corresponds to the nominal operation of maintaining a fail-safe active control, for example a dynamic signal of frequency 1 MHz, of the power breaker 223 which is then switched on. The "0" state corresponds to a failure for which the input of the first logic switcher 414 is in the "0" or "1" steady state.

Similarly, the second safety block 420 comprises a fourth "OR" type logic operator 421 driven:
  by all the monitoring signals from the control 120 and monitoring 130 modules, determined by the outputs of the four comparators 124, 134, 135, 136 and bits deriving from the various additional tests performed in the control module 120 and the monitoring module 130, and cited previously with reference to FIG. 1, and by a disabling logic signal RTN_INH, a logical duplication of one or other of the external disabling commands obtained from the FCM system acting directly at the lowest level on the power breaker 223 or from the enabling circuit for the power bridge 221 supplying energy to the actuator 110.

The output of the fourth logic operator 421 is inverted and drives the input of a sixth "AND" type logic operator 423, the other input of the sixth logic operator 423 being driven by the logic output of a fifth "OR" type logic operator 422, which is itself driven by logic signals obtained from commands respectively for recentring the actuator 110 and engaging the latter.

Via a second logic switcher 424, the output of the sixth logic operator 423 conditions the opening of the slowing-down switches 304. The second logic switcher 424 corresponding to the "1" state of the sixth logic operator 423 corresponds to the nominal operation of maintaining a fail-safe active control, for example a dynamic signal of frequency 1 Hz, of the power bridge 221 which is then activated. The "0" state corresponds to a failure for which the input of the second logic switcher 424 is in the "0" or "1" steady state: thereby opening the three top switches 303 of the power bridge 221 and simultaneously switching on the three bottom switches 304 of the power bridge 221 with associated slowing-down action.

Similarly, the third safety block 430 comprises a seventh "OR" type logic operator 431 driven:

by all the monitoring signals from the control 120 and monitoring 130 modules, determined by the outputs of the four comparators 124, 134, 135, 136 and bits deriving from the various additional tests performed in the control module 120 and the monitoring module 130, and cited previously with reference to FIG. 1, and by a disabling logic signal RTN_INH, a logical duplication of one or other of the external disabling commands obtained from the FCM system acting directly at the lowest level on the power breaker 223 or from the enabling circuit for the power bridge 221 supplying energy to the actuator 110.

The output of the seventh logic operator 421 is inverted and drives the input of an eighth "AND" type logic operator 433, the other input of the sixth logic operator 433 being driven by the logic output of a fifth "OR" type logic operator 422, which is itself driven by logic signals deriving from commands respectively for recentring the actuator 110 and engaging the latter.

Via a third logic switcher 434, the output of the sixth logic operator 423 conditions the activation of the PWM function provided by the actuation module 121. The third logic switcher 434 corresponding to the "1" state of the sixth logic operator 433 corresponds to the nominal operation of a PWM command controlling the six switches 303, 304 of the power bridge 221. The "0" state corresponds to a failure for which the input of the third logic switcher 434 is in the "0" steady state, stopping any PWM command to the six switches 303, 304 of the power bridge 221.

It should be noted that the abovementioned control and monitoring modules 120, 130 may both be implemented in an electronic card, for example in a programmable logic circuit of FPGA type, the acronym FPGA standing for "Field Programmable Gate Array", the FPGA being powered by a power supply block. Nevertheless, in order to offer greater robustness, it is notably possible to implement the modules in two separate FPGAs, each FPGA module having, for example, its own clock. It is also possible to duplicate the power supplies so that each FPGA has its own power supply block. In one embodiment of the invention, an actuator may be packaged in a single physical module comprising the power supply or power supplies, the electronic card(s), and the series actuator proper.

The invention claimed is:

1. A monitoring and control device for an aircraft actuator, comprising:

a control module, delivering control signals for the actuator and position signals for the actuator respectively determined according to control messages received from a piloting management system of the aircraft, and at least one first position sensor supplying information concerning a position of the actuator, a monitoring module, delivering actuator position signals and simultaneously receiving the control messages received from the piloting management system of the aircraft, and information relating to the position of the actuator supplied by at least one second position sensor, said control and monitoring modules being capable of assessing a consistency of the signals processed therein and of controlling accordingly an actuator power supply and a disabling module, the actuator being moved by a brushless electric motor, the first position sensor being a Hall-effect type sensor supplying information concerning a rotational positioning of a rotor of the motor, the position of the actuator being determined by the control module based on an initial position datum supplied by the monitoring module, the control module comprising a first simulation module receiving the control messages received from the piloting management system of the aircraft, and simulating a behavior of the actuator and generating a first actuator virtual position signal.

2. The monitoring and control device according to claim 1, in which the initial position datum is supplied to the control module when the monitoring and control device for an actuator is started up.

3. The monitoring and control device according to claim 1, in which the second position sensor is an actuator position sensor.

4. The monitoring and control device according to claim 1, the control module further comprising:

an actuation module controlling the actuator via the power supply and disabling module, a first position processing module processing the data originating from the first position sensor and generating and sending to the actuation module a first signal representative of the position of the actuator.

5. The monitoring and control device according to claim 4, in which the monitoring module comprises a second position processing module processing the data originating from the second position sensor and generating a second signal representative of the position of the actuator.

6. The monitoring and control device according to claim 1, in which the monitoring module comprises a second simulation module receiving the control messages received from the piloting management system of the aircraft, and simulating the behavior of the actuator and generating a second actuator virtual position signal.

7. The monitoring and control device according to claim 1, comprising a first comparator, the output of which changes from one nominal logic level to the other if the first actuator virtual position signal differs from the first signal representative of the position of the actuator by a value greater than a first determined threshold.

8. The monitoring and control device according to claim 7, comprising a second comparator, the output of which changes from one nominal logic level to the other if a control signal received by the control module differs from the control signal received simultaneously by the monitoring module by a value greater than a second determined threshold.

9. The monitoring and control device according to claim 8, comprising a third comparator, the output of which changes from one nominal logic level to the other if the second actuator virtual position signal differs from the second signal representative of the position of the actuator by a value greater than a third determined threshold.

10. The monitoring and control device according to claim 9, comprising a fourth comparator, the output of which changes from one nominal logic level to the other if the first signal representative of the position of the actuator differs from the second signal representative of the position of the actuator by a value greater than a fourth determined threshold.

11. The monitoring and control device according to claim 1, in which the power supply and disabling module comprises:
- a power supply module powered by a main power supply voltage, and processing the power supply signal to generate the power supply signals for the various modules forming the monitoring and control device;
- a power distribution module, generating, on the basis of the information supplied by the actuation module, a modulated signal to control the motor, and responsible for freezing or disabling the actuator in the event of failure, detected on the basis of a summary logic signal dependent at least on the logic level of the outputs of the comparators.

12. The monitoring and control device according to claim 11, in which the power supply and disabling module comprises, on the main power supply line, a power breaker, a first current measuring device, in series with which is arranged a power bridge, the power bridge comprising a top switch in series with a bottom switch and generating the modulated control signal for the motor, the power breaker and said switches being controlled by said summary logic signal.

13. The monitoring and control device according to claim 12, in which the power breaker, the switches and the motor are controlled via logic switchers:
- a first logic switcher controlling the power breaker, and being maintained by a dynamic signal of determined frequency,
- a second logic switcher controlling the switches, and being maintained by a dynamic signal of determined frequency,
- a third logic switcher controlling the activation of the modulated control signal for the motor.

14. The monitoring and control device according to claim 13, in which the motor is a brushless-type motor with three windings, the top switch and the bottom switch each being formed by three field-effect transistors respectively associated with each winding of the motor.

15. The monitoring and control device according to claim 11, in which the summary logic signal is also conditioned by logic results of correct operation tests on the modules forming the monitoring and control device.

16. The monitoring and control device according to claim 13, in which the freezing or disabling of the actuator is also controlled by logic disabling signals from the flight management system.

17. The monitoring and control device according to claim 1, in which the control module and the monitoring module are implemented in at least one programmable logic circuit.

18. The monitoring and control device according to claim 17, in which the control module is implemented in a first programmable logic circuit, and the monitoring module is implemented in a second programmable logic circuit.

19. The monitoring and control device according to claim 18, in which the control module and the monitoring module are associated with one and the same power supply circuit.

20. The monitoring and control device according to claim 18, in which the control module and the monitoring module are each associated with a dedicated power supply circuit.

21. The monitoring and control device according to claim 1, in which the control module, the monitoring module, the actuator, the position sensors and the power supply and disabling module are integrated in one physical module.

\* \* \* \* \*